United States Patent [19]

Ragazzini et al.

[11] 4,456,573
[45] Jun. 26, 1984

[54] METHOD FOR THE PRODUCTION OF AGED AND EXPANDED POLYSTYRENE PANELS

[75] Inventors: Franco Ragazzini; Roberto Colombo, both of Turin, Italy

[73] Assignee: Lavorazione Materie Plastiche L.M.P. S.p.A., Turin, Italy

[21] Appl. No.: 394,581

[22] Filed: Jul. 2, 1982

[30] Foreign Application Priority Data

Jul. 27, 1981 [IT] Italy .............................. 68043 A/81

[51] Int. Cl.³ .......................................... B29D 27/00
[52] U.S. Cl. .................................. 264/53; 249/113; 249/161; 264/DIG. 15; 425/4 R; 425/443; 425/450.1; 425/817 R
[58] Field of Search ................... 264/53, 51, DIG. 15; 249/113, 161; 425/450.1, 443, 4 R, 817 R

[56] References Cited

U.S. PATENT DOCUMENTS

| 1,607,047 | 11/1926 | Bertelsen, Jr. | 264/124 |
| 2,167,800 | 8/1939 | Flotron | 264/124 |
| 2,250,697 | 7/1941 | Bassett | 264/124 |
| 2,442,940 | 6/1948 | Staudinger et al. | 264/53 |
| 2,740,157 | 4/1956 | McCurdy et al. | 264/53 |
| 2,945,261 | 7/1960 | Aykanian et al. | 264/53 |
| 3,011,217 | 12/1961 | Carlson, Jr. | 264/53 |
| 3,042,972 | 7/1962 | Lafferty | 264/53 |

FOREIGN PATENT DOCUMENTS 971378 9/1964 United Kingdom ....... 264/DIG. 15

OTHER PUBLICATIONS

Stastny, Fritz, "Molds and Fixtures for Styropor Fabrication," pp. 1-5, (translation of BASF reprint of: "Formen und Vorricatungen zur Verarbeitung von Styropor", in *Der Plastverarbeiter*, vol. 5, No. 9, pp. 3-7 of 12 pp.).

*The Condensed Chemical Dictionary*, Eighth Edition, revised by Gessner G. Hawley, New York, Van Nostrand Reinhold, ©1971, pp. 252-254.

*Primary Examiner*—Philip E. Anderson
*Attorney, Agent, or Firm*—Sughrue, Mion, Zinn, Macpeak and Seas

[57] ABSTRACT

A process for manufacturing expanded polystyrene panels includes the following stages:

(a) Preparation of pre-expanded panels of polystyrene by extrusion and simultaneous injection of propellent agent into an extruder fitted with an extrusion die of suitable type and in particular fitted with means allowing for good mixing of the molten polymer with the propellent agent and means allowing for uniform cooling to the best value of the temperature of the expandable plastic mass before exit from the die.

(b) Conditioning of said panels at room temperature or at whatever temperature higher than room temperature, provided it is such to prevent the panels from undergoing either dimensional variation or deformation due to internal stress or true expansion.

(c) Forming of pre-expanded panels into a mould-box by means of heat furnished by convection by a hot fluid the ratio between internal dimensions of the box and measures of pre-expanded panels being such that 60 percent at least of the volumetric increase given to the mass is affected to their average increase in thickness.

2 Claims, 14 Drawing Figures

METHOD FOR THE PRODUCTION OF AGED AND EXPANDED POLYSTYRENE PANELS

The present invention is directed to a method and apparatus for the production of expanded polystyrene panels and more specifically, expanded polystyrene panels having a thickness of 20-80 mm which are primarily used for the thermal insulation of walls and flat roofs in various buildings. The quality of the panels depends upon their longevity, heat transmission factor, density, compressive and flexural strength and dimensional stability.

Expanded polystyrene panels are currently produced by the industry using two basic processes. The first process involves the pre-expansion of expandable polystyrene beads and the subsequent additional expansion of such beads into suitable molds by means of steam. Panels of very low density, for example, 0.010 kg/c dmc., can be obtained by this process while panels normally accepted for insulation in buildings have a density such as 0.015-0.020 kg/c. dmc. Even though such panels are relatively inexpensive to produce they are used less frequently because they tend to crush after a period of time since the cohesion keeping the single particles of expanded material together, while poor at the time of production, has a tendency to diminish still further. With the second process, the panels are made by extruding molten polystyrene containing a blowing agent, for instance, Freon 12 or a mixture of Freon 11 and 12, into the atmosphere where the mass expands. Panels manufactured according to the second process generally having a much higher density, for example 0.03-0.045 kg/c. dmc., compared to panels manufactured in accordance with the first process and are considered more advantageous due to longer life and better mechanical properties, chiefly stiffness and toughness which are much higher than in the first case.

The present invention is directed to apparatus and processes by which pre-expanded panels extruded from polystyrene and other similar polymers having a density of 0.030-0.045 Kg/c. dmc. can successfully be transformed into panels having a density of 0.016-0.024 kg/c. dmc. and a thickness generally twice as great as the original panels. It is known that an extruded panel of expanded polystyrene tends to expand further when heated to a temperature higher than its softening point, for example to 100°-120° C. One of the features of the present invention is the use of apparatus and processes allowing the exploitation of the above tendency in an efficient industrial manner and to control such a tendency in the best way possible for obtaining panels having a very low density and at the same time having an exceptional thickness and toughness which was quite impossible prior to the present invention. As a matter of fact, panels manufactured according to a process covered by the present invention join the low cost and low density of panels obtained by steam molding to the high mechanical strength and the unlimited life of panels obtained by extrusion.

The process according to the present invention is characterised in that it includes the following stages:

(a) Preparation of pre-expanded panels of polystyrene by extrusion and simultaneous injection of propellent agent into an extruder fitted with an extrusion die of suitable type and in particular fitted with means allowing for good mixing of the molten polymer with the propellent agent and means allowing for uniform cooling to the best value of the temperature of the expandable plastic mass before exit from the die.

(b) Conditioning of said panels for a predetermined period of time at room temperature or at whatever temperature higher than room temperature, provided it is such to prevent the panels from undergoing either dimensional variation or deformation due to internal stress or true expansion, (c) Forming of pre-expanded panels into a mould-box by means of heat furnished by convection by a hot fluid the ratio between internal dimensions of the box and measures of pre-expanded panels being such that 60 percent at least of the volumetric increase given to the mass is affected to their average increase in thickness.

The foregoing and other objects, features and advantages of the invention will be apparent from the following more particular description of a preferred embodiment of the invention as illustrated in accompanying drawings.

Figure 1:
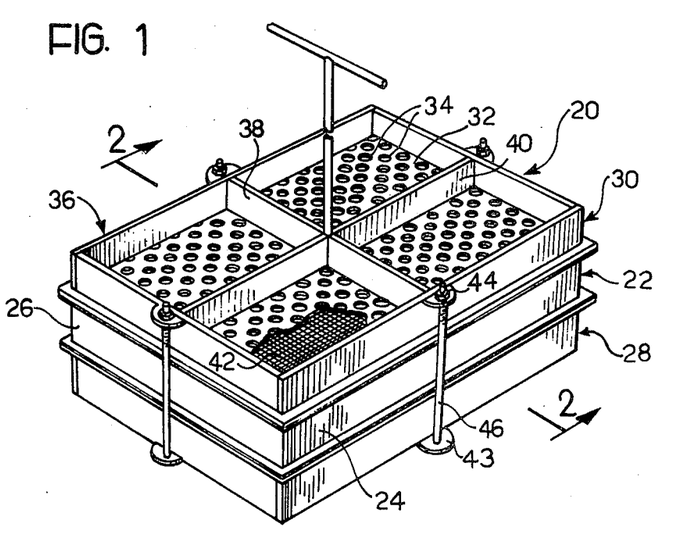
FIG. 1 is a perspective view, partially broken away of an experimental apparatus according to the present invention.
Figure 2:
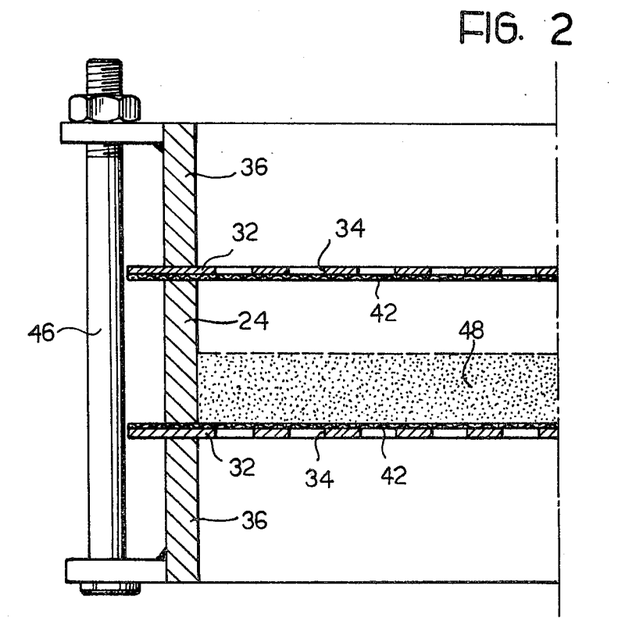
FIG. 2 is a partial sectional view taken along the line II—II in FIG. 1.

A mass of pre-expanded polystyrene obtained by extrusion by any suitable extrusion apparatus and having a rectangular shape $l_1$ long, $l_2$ wide and $l_3$ thick, when immersed in a stirred solution at a temperature of 100°-115° C., will irregularly expand in every direction and after a time proportional to the square of the thickness finally reached, for example after three minutes starting from an initial thickness of 20 mm, the temperature of the solution being 107° C., its volume will double the initial one. FIGS. 1 and 2 show an experimental apparatus or mold box for carrying out the process according to the present invention. The mold box 20 is comprised of an open rectangular frame 22 having two long sides, one of which is shown at 24 and two short sides, one of which is shown at 26. The box 22 is sandwiched between a bottom member 28 and a cover member 30. Since the two members 28 and 30 are substantially identical, only the cover member will be described in detail. The cover member 30 is comprised of a sheet 32 of relatively stiff material having a plurality of apertures 34 extending therethrough. The apertures are circular and each have a diameter of 10 mm with the total surface area of the apertures equally approximately 50% of the total surface of the sheet 32. The surface of the sheet 32 facing the box 22 is covered with a wire net comprised of stainless steel wire 0.4 mm in diameter forming 80 mesh per sq. cm. A rectilinear frame 36 having cross-pieces 38 and 40 is secured to the surface of the sheet 32 opposite the wire net 42 to provide support for the sheet and net. The bottom member 28 and the cover member 30 are each provided with a plurality of apertured tabs 43 and 44, respectively, through which a nut and bolt assembly 46 may extend for holding the bottom and cover members in clamped engagement against the box 22. The pre-expanded polystyrene block or sheet 48 is shown in FIG. 2 within the box 22 resting o The ratio between the inner dimensions of the mold box and the dimensions of the pre-expanded block as described above is as follows:

$l_a$ (inner length of the box)=1.03 $l_1$
$l_b$ (inner width of the box)=1.03 $l_2$
$l_c$ (inner height of the box)=1.9 $l_3$ If the block 48 of pre-expanded polystyrene is then immersed in a stirred solution at a 100°–115° C. temperature after putting it into the box as shown in FIGS. 1 and 2, after a time approximately proportional to the square of the final thickness, it will expand to a double volume thus filling the entire box and after a longer time exerts a pressure on the box generally up to a maximum of 0.2–0.3 kg/sq. cm. It was thus found that when immersing the pre-expanded mass contained in the mold box into the hot solution there was no impediment to expansion due to the fact that it can take place in a single direction thus substantially doubling its thickness. It was also found that the expansion taking place in the box according to the present invention compels the expanded mass to acquire a cellular structure consisting of cells the cross-section of which along planes normal to the two main faces of the panel are chiefly elliptical, the main axis of the ellipses being chiefly normal to the two main faces of the panel, imparts to the panel thus formed a high modulus of elasticity in compression approximately two or three times higher than for panels which were given the same volumetric expansion by direct immersion into a heating fluid. At the same time it was found that while the expanded mass as formed in the mold box tends to maintain, after cooling, the shape and dimension of the mold itself, a mass of even density and much lower stiffness as obtained by free expansion in a hot liquid will shrink to a sensible extent after cooling.

In a variation of the foregoing experiment, it was found that the stiffness of the formed panel could be brought to excellent values by using a relatively low expansion temperature and hence a relatively long expansion cycle. It was also discovered that the two main plates of the mold blocks consisting of the apertured sheet covered by a wire net could be varied. The holes drilled in the sheet could have a diameter for instance, of 1.5 to 15 mm and preferably range in parallel rows so that the center distance between holes is constant. To allow for heat transmission by convection from the hot solution to the pre-expanded mass in the best possible way, the distance between the hole centers should be such that the bored surface is at least 5% of the full surface. The wire nets which, along with the bored sheet, form the two main plates of the box, can be made from a wire having a diameter equal to or less than 1 mm and woven in such a manner that the distance between the wires is always equal to or less than 1.5 mm. If the mesh of the net is too large the material of the panel being formed will infiltrate too much into the interstices thus causing troublesome adhesion between the panel and the mold plate. The bored sheet acts as a first supporting structure for the wire net and the finer the wire net the smaller should be the diameter of the holes drilled in the sheet. It is also possible to replace the above arrangement with two plain bored sheets provided that the bores are so small as to reduce the depth of infiltration of the expanded mass into the holes to a negligible quantity so that the adhesion between the formed panel and the bored sheet is practically nill. It will thus be possible to use, for example, a bored sheet with holes having a diameter equal to or less than 2 mm covering the 5% to 50% of the entire surface.

In the experiments described above, the expansion of the pre-expanded mass was obtained by immersion in a stirred fluid which in this case was a liquid. It was found that the results of tests were practically unchanged if the fluid used for the heat convection is a gaseous fluid such as air. Of course the expansion time with a gaseous fluid will be much longer than in the case when the pre-expanded mass is expanded by direct immersion in a hot liquid, especially in the case when the pre-expanded mass is immersed in the gaseous fluid when put into a mold box having an initial temperature equal to or a little higher than the room temperature.

Using the know-how and general principles developed by using the experimental apparatus of FIGS. 1 and 2 several different types of industrial apparatus were developed primarily for use with a liquid fluid as the heat convection means. Such apparatus allows for an economical and efficient industrial production of expanded polystyrene panels or of panels from another expanded polymer of a similar type being characterized by a low density and excellent quality. Various apparatus developed allow for the automatic opening and closing of the mold wherein the bottom plate is fixed and the top and side plates are movable. As in the experimental apparatus the two main plates may be either a bored sheet covered by a wire net or a plain bored sheet. In the industrial apparatus it was found that the expansion of the pre-expanded mass and the space included between the top and bottom main plates and the four side plates could be effected in the shortest possible time if a liquid was thermally regulated at 95°–135° C. (preferably at 100°–120° C.) and was circulated by suitable means as described hereinafter below the bottom plate and above the top plate. The industrial apparatus are provided with an arrangement such that the mold can be automatically and instantaneously opened after the expansion of the mass in order to release the panel for easy removal and the subsequent replacement of a fresh pre-expanded mass followed by the subsequent automatic and instantaneous closure of the apparatus to start a new cycle.

Figure 3:
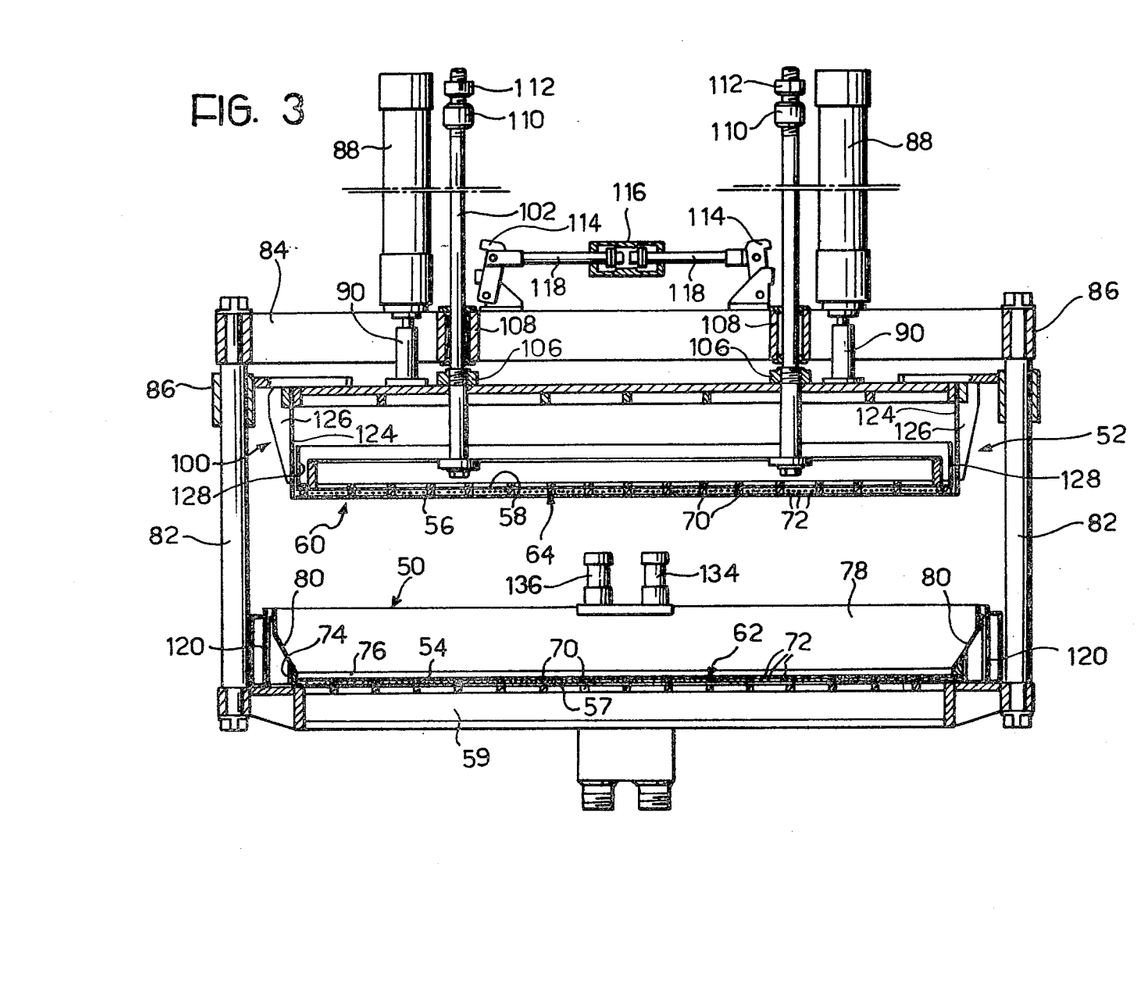
FIG. 3 is a side elevation view, partially in section, of a first commercial embodiment of an apparatus according to the present invention.
Figure 4:
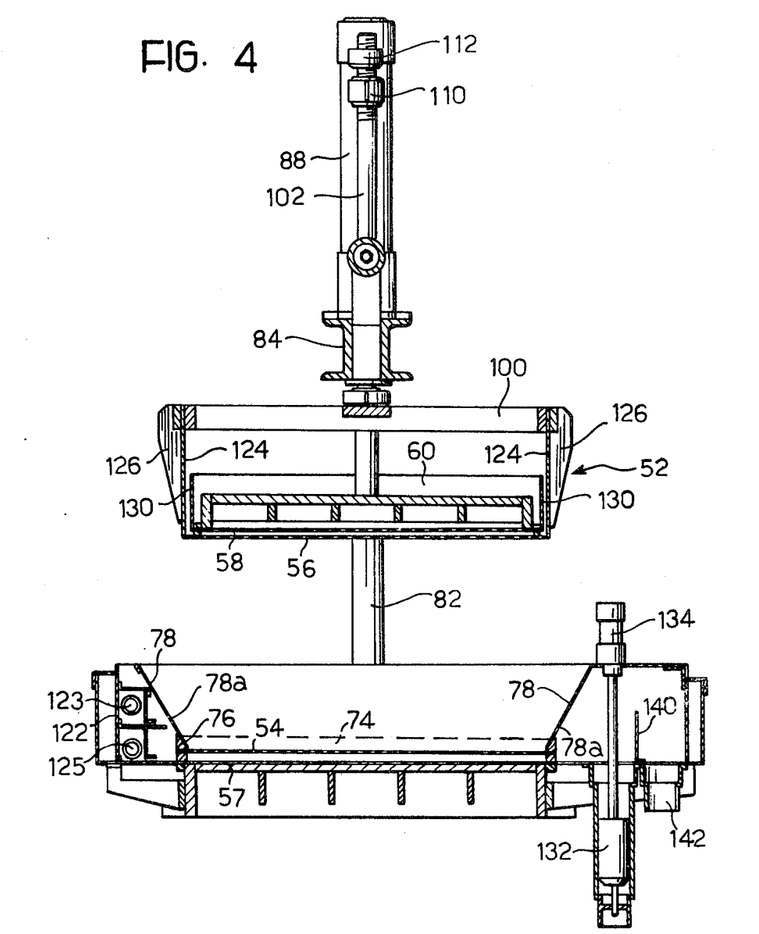
FIG. 4 is an end elevation view, partly in section of the apparatus shown in FIG. 3.
Figure 5:
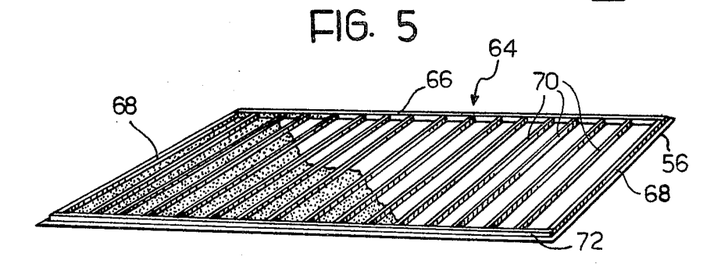
FIG. 5 is a perspective view of the light frame for connecting the top plate to the rigid movable frame.

A first embodiment of a suitable industrial apparatus is shown in FIGS. 3–5 wherein the bottom plate assembly 50 is fixed and the top plate assembly 52 may be raised and lowered into cooperating relation to the lower plate assembly 50.

The bottom plate assembly 50 is provided with a pair of upstanding cylindrical legs 82 which are connected at their upper ends to a transverse frame member 84. The top plate assembly 52 includes an upper support frame 100 which is provided with a pair of laterally extending hollow tubular sleeves 86 which are slidably mounted onto the cylindrical legs 82 so as to guide the upper support frame 100 for vertical reciprocating movement relative to the bottom plate assembly 50. Such vertical reciprocating movement of the upper support frame 100 is driven by a pair of pneumatic cylinders 88 supported on the cross-frame 84 and having their stems 90 connected to the upper support frame 100.

The top plate assembly 52 further includes a lower support frame 60 which is supported by the upper support frame 100 and is adapted to slide vertically relative to the latter, as it will be apparent from the following description.

The lower support frame 60 is connected to the lower ends of two tubular rods 102 which are slidably mounted within the upper support frame 100. The rods 102 are provided with adjustable nuts 106 which engage the upper support frame 100 when the latter is in the raised position illustrated in FIGS. 3, 4, so that the lower support frame 60 is supported by the upper support frame 100. The rods 102 are guided for vertical reciprocatory movement in a pair of bearing sleeves 108 carried by the frame member 84. A pair of adjustable rings 110 and 112 are threaded on the upper end of each rod 102 for engagement with the frame 84 and the pivoted latch 114, respectively. Each pivoted latch 114 is moved towards and away from a respective rod 102 by means of a double acting pneumatic cylinder 116 having a piston rod 118 connected to latch members 114. The upper support frame 100 includes four vertical plates 124 provided with stiffening fins 126. By way of example, the shortest sides 124 are 600 mm and the longest sides 124 are 1250 mm.

The bottom plate assembly 50 and the lower support frame 60 of the top plate assembly 52 are each comprised of wire net covered perforated sheets 54 and 56, respectively, similar to the wire net covered perforated sheets 32 in the experimental apparatus of FIGS. 1 and 2. A pair of retaining sheets 57 and 58 are secured to the support frames 59 and 60 of the lower and upper plate assemblies 50 and 52, respectively. Rectangular frames 62 and 64 are sandwiched between the retaining sheets and the wire net covered perforated sheets of the bottom and top plate assemblies 50 and 52, respectively. The frame 64 is shown in detail in FIG. 5 and is comprised of a pair of side strips 66 and a pair of end strips 68 secured together to define a rectangular frame having a plurality of parallel spaced apart square sectioned strips 70 extending between the side strips 66 parallel to the end strips 68. The side strips 66 are provided with a plurality of holes 72 to allow a flow of fluid into the space between the strips 70. The frame 62 associated with the bottom plate is identical to the frame 64 described above. The bottom plate assembly 50 is provided with strips 74 and 76 which in conjunction with the tapered side walls 78 and 80 define a chamber for receiving the pre-expanded polystyrene panel prior to the initiation of the subsequent expansion cycle. The tapered walls 78 and 80 help guide the pre-expanded polystyrene panel into place within the rectangular frame defined by the strips 74 and 76. The clearances between the pre-expanded panel and the strips 74 and 76 are on the order of the clearances between the pre-expanded panel 48 and the rectangular frame 24 in the experimental apparatus described above.

The longer side plates 124 of the upper support frame 100 of top plate assembly 52 bear two horizontal rows of holes for circulating a heating or cooling liquid through the mold, which are generally aligned with the hole 72 in the lower support frame 60.

Two pairs of side walls 120 and 122 shown in FIGS. 3 and 4 define with the upper surface of the lower support 59 a container for circulating the treating fluids for the panels. Inlets 123 and 125 are provided within the chamber for the heating fluid and the cooling fluid respectively. Walls 78 are provided with orifices 78a for allowing fluid flow therethrough. Walls 128 and 130 are associated with the lower support frame 60 of the top plate assembly 52 to prevent the fluids from flowing over the upper surface of the support frame 60. A discharge valve 132 is provided for the chamber as shown in FIG. 4 and is opened and closed by means of a pneumatic piston and cylinder assembly 134. The discharge valve 132 is provided for hot fluids and a similar discharge valve (not shown) which is operated by a pneumatic piston and cylinder arrangement 136 shown in FIG. 3 is provided for the cooling fluids. In order to control the level of the fluid in the chamber defined by the walls 120 and 122, a plate 140 having a height less than the walls 120 and 122 is provided within the chamber. After the fluid fills the chamber, the excess fluid will overflow the plate 140 and pass through an outlet 142 to a recycling arrangement (not shown).

The apparatus disclosed in FIGS. 3–5 is designed to form panels having a maximum gauge of 80 mm. In the operation of the apparatus a pre-expanded polystyrene panel is firstly deposited on the sheet 54 within the chamber defined by walls 78, 80. Then the cylinders 88 are operated so as to cause a lowering movement of the upper support frame 100 and a corresponding movement of the lower support frame 60 which rests onto the frame 100 by means of the nuts 106. When the adjustable nuts 110 come into engagement with the upper surface of the upper support frame 100, the frame 60 stops while frame 100 continues to be moved downwardly until the vertical plates 124 engage the lower plate assembly closing the mold. Then the heating fluid is introduced via inlet 123 causing expansion of the panel. During such expansion frame 60 moves upwardly relative to frame 100 until adjustable nuts 112 engage latches 114. After expansion, the panel is cooled by means of the cooling fluid introduced via inlet 125. Finally, cylinders 88 are operated to raise the frame 100 so as to open the mold. When the latter comes into engagement with nuts 106, it also causes a raising movement of frame 60 so as to return in the position shown in FIGS. 3, 4.

A complete forming cycle of a panel takes place in the following order:

1. The operator puts a pre-expanded panel on the lower main plate 54 and pushes a button (not shown) to start the cycle.

2. The pneumatic cylinders 88 displace the frames 100 and 60 to their lower stop positions whereupon the two latch members 114 will be operated by the pneumatic piston and cylinder assembly 116, 118 to engage the upper surfaces of the rings 112 on the rods 102.

3. The delivery valve for the hot liquid is opened and the hot liquid fills the chamber to overflow the plate 140 for recirculation through the outlet 142. During the scheduled time expansion takes place and the panel is formed.

4. The delivery valve is closed and the discharge valve 132 for the hot liquid is opened by means of the pneumatic cylinder 134.

5. When the chamber is emptied, the discharge valve for the hot liquid is closed and the delivery valve for a cooling liquid is opened and stayed open until the chamber has been filled. After a predetermined cooling time, the discharge valve for the cooling liquid is opened and the chamber is emptied. The latches 114 are then moved to the open position.

6. Immediately after the unlatching of the rods 102, the pneumatic cylinders 88 are actuated to raise the frames 60 and 100 to their raised positions. The completed panel may then be removed and a new extruded slab inserted for a subsequent cycle. The entire cycle can be automated by a simple circuit which is primarily comprised of a set of interconnected timers.

The described machine is an example of a forming unit based on the principles and general knowhow which are the subject of the present invention. In the foregoing example, the mold is opened and closed by the vertical displacement of a main upper plate and four side plates. In a variation of this machine (not illustrated) the four side plates 124 are so shaped as to allow obtention of panels with molded tongues and grooves along the side thereof. Moreover, each of the plates 124 is pivotally mounted onto the frame 100 around its upper edge so as to allow extraction of the expanded panel from the mold.

In this manner it is possible to obtain panels having for instance two adjacent side walls formed with ribs and the other two adjacent side walls formed with grooves.

The forming time for a panel, that is the time taken by the pre-expanded panel to expand due to heat taken from the circulating hot liquid until it has filled the entire mold, is, under even working conditions, directly proportional to the square of the thickness of the desired finished panel. The forming time for a finished panel 40 mm thick can vary, for even weight and thickness of pre-expanded panels, with a circulation temperature of 107° C. for the hot liquid, from 3 to 4 minutes according to the type of polymer as well as the type and quantity of propellent agents used for the extrusion of the pre-expanded panels. The time taken by the complete cycle under the same conditions will be 4 to 5 minutes.

To make the process more productive and the plant more economical, several forming units can be set up in series and fed by a single pump for the hot liquid and a single pump for the cooling liquid. It was found that the flow of both heating and cooling liquids through the units can vary to a very small extent even when due to working requirement, most of the units are idle, provided that centrifugal horizontal pumps are used having delivery-lift curves which are substantially flat.

The above-described devices according to the present invention were based upon heat convection by a liquid fluid. No matter which heat convection means is used, that is, liquid or gaseous fluids, for correct formation of the panel, both the mold and the panel itself should be heated and maintained at a desired temperature for a predeterminated time. The devices discussed above are industrially competitive since by using a liquid convection means, the heating of the mold is almost immediate thereby causing the quick heating of the pre-expanded extrudate. When using an gaseous fluid as the convection medium, the heating time will be relatively long for both the mold and the panel in order to enable the panel to reach the expansion temperature. However, it was found that units based upon an gaseous fluid as the heat convection means can be successfully used if several molds are set up parallel to each other at a distance of 10 to 40 mm from each other. In this way, one of the two main plates of a mold member forms a gap with one of the two main plates of the next mold member. The gap is first used for the circulation of a heating gaseous fluid and then for the circulation of a cooling gaseous fluid.

In the embodiment of FIGS. 6–10, several mold members have been set up parallel to each other for pivotal movement to allow for the easy insertion and removal of panels.

Figure 6:
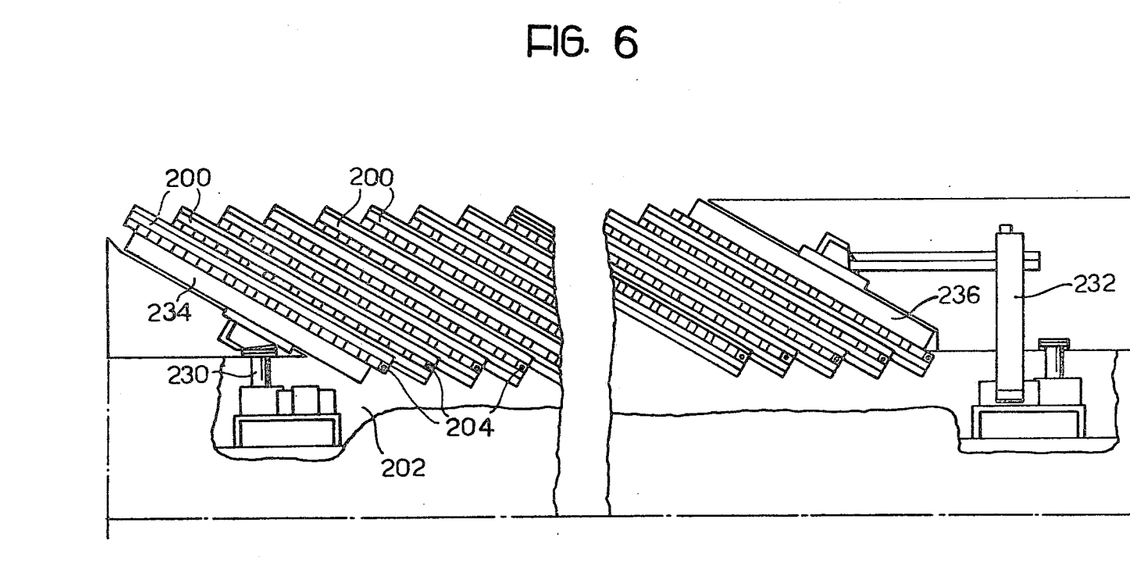
FIG. 6 is a side elevation view, partly broken away of a second commercial embodiment of an apparatus according to the present invention with the molds all tilted to the left.
Figure 7:
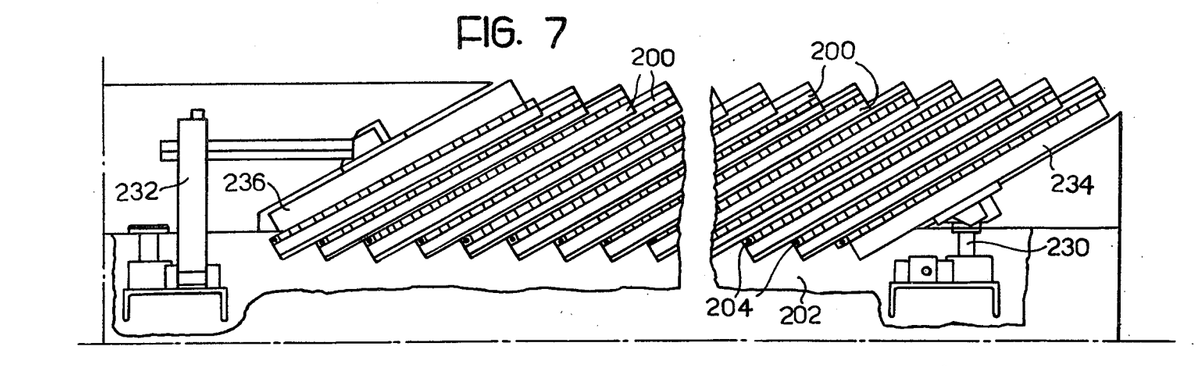
FIG. 7 is a side elevation view, partly broken away of the second commercial embodiment of the apparatus as shown in FIG. 6 with the molds all tilted to the right.
Figure 8:
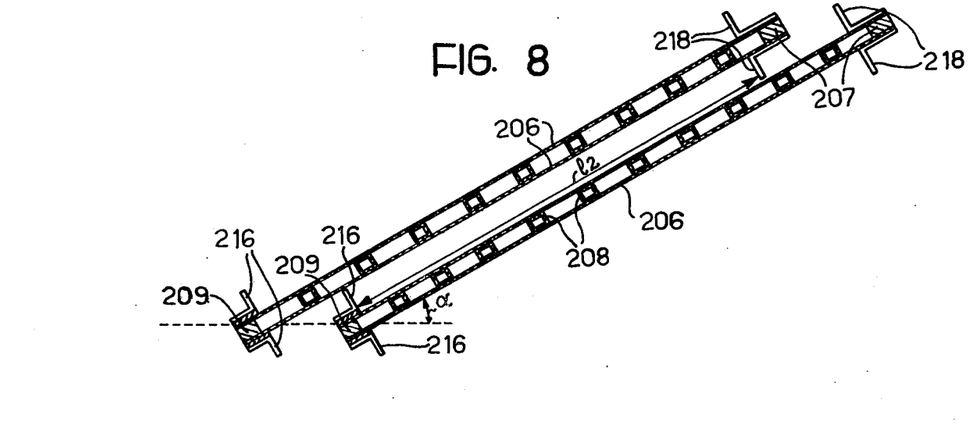
FIG. 8 is an enlarged detail view showing the relationship of two adjacent parallel molds from the apparatus in FIG. 7.
Figure 9:
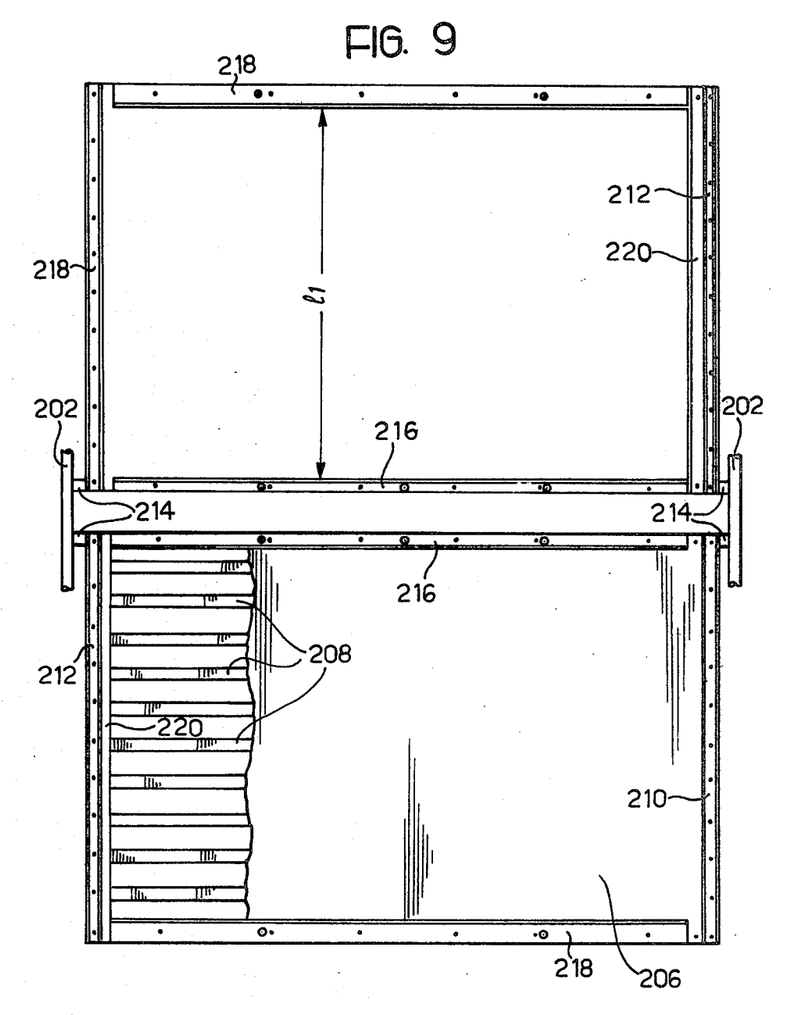
FIG. 9 is a top plan view of the apparatus shown in FIGS. 6 and 7 showing two molds tilted in opposite directions.
Figure 10:
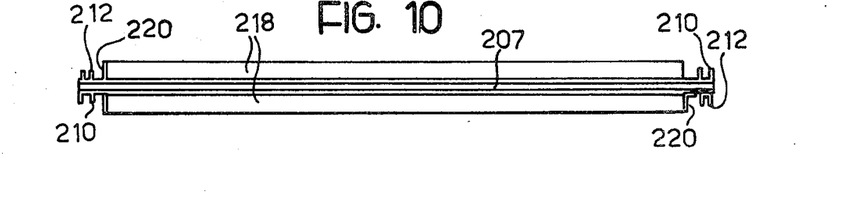
FIG. 10 is a side elevation view of the mold element according to the present invention.

In FIG. 6, a plurality of mold members 200 are each pivoted at 204 to a support member 202 in parallel relationship to each other. The construction of the individual mold members 200, which are identical to each other, is best seen in FIGS. 8, 9 and 10. Each mold member 200 is comprised of two flat parallel plates 206 which may be of aluminium or any other suitable heat conductive material. A plurality of parallel spaced hollow aluminium tubes 208 having a substantially square cross-section are secured between the plates 206 as best seen in FIG. 8. Iron bars 207 and 209 are secured between the aluminium sheets 206 along the edges thereof to form a rigid assembly. To further reinforce the assembly, a pair of elongated U-shaped channels 210 and 212 are secured to the surfaces of the plates 206 along the shorter edges of the rectilinear mold assembly. The iron bars 209 are machined at their ends to receive the pivots 214 which allow the mold members to rotate relative to the support frame 202. A pair of L-shaped aluminium strips 216 and 218 are secured to opposite sides of each mold member 200 by means of bolts, screws or the like along the longer edges of each mold member. A shorter L-shaped aluminium strip 220 is secured to one side of the mold member along one short edge of the mold member adjacent the U-shaped channel member 212 and another shorter L-shaped strip 220 is secured along the opposite side of the mold member along the opposite shorter edge adjacent the U-shaped channel member 212. The mold member 200 may be assembled by means of nuts and bolts or any other suitable means and provides a substantially hollow interior for the passage of a fluid therethrough. The ends of the channels 208 are open at the opposite ends as are the spaces between each of the channels 208 to facilitate the passage of the treating fluid therethrough. The faces of the L-shaped strips 216, 218 and 220 which face towards the interior of a mold, form an angle with the aluminium sheets 206 slightly greater than 90 to facilitate the removal of the formed panels upon opening of the mold.

In FIG. 8, two adjacent mold members 200 are shown in section and are disposed parallel to each other at an angle $\alpha$ with respect to the horizontal plane. The individual mold members 200 may be rotated from the position shown in FIG. 6 wherein they are disposed at said angle $\alpha$ relative to the horizontal plane to the position shown in FIG. 7 wherin the individual mold members are disposed at said angle $\alpha$ relative to the horizontal plane. An extruded, pre-expanded panel is adapted to be located between each adjacent pair of mold members 200. As viewed in FIG. 8, the extruded panel would be placed between the upwardly projecting L-shaped strip 216 on one member 200 and the downwardly extending L-shaped strip 218 on the adjacent mold member which are spaced apart a distance $l_2$. This distance $l_2$ is equal to the desired width of the final expanded panel.

When using the multiple mold members as illustrated in this embodiment, it will be possible to vary the gauge or thickness of the formed panel by varying the angle $\alpha$ of the individual mold elements 200 with respect to the horizontal plane or, less preferably, varying the center distance between the hinge pins for the individual mold members. It has been found that the relationship between the gauge T of the panel, the distance I between the hinge centers, the thickness S of the mold elements 200 and the angle $\alpha$ formed by the mold elements 200 with the horizontal plane is the following:

$$\alpha° = \arcsin \frac{(T + S)}{I} \text{ where } I > T + S$$

In the apparatus as shown in FIG. 6, I is equal to 130 mm and S is equal to 23 mm.

The following table indicates the various angles $\alpha$ for the mold elements in order to obtain panels 30 to 60 mm thick.

TABLE NO. 1

| Thickness of Panel | $\alpha°$ |
|---|---|
| 30 | 24° |
| 35 | 26.5° |
| 40 | 29° |
| 45 | 31.5° |
| 50 | 34.2° |
| 55 | 36.9° |
| 60 | 39.7° |

It will thus be possible to vary the thickness of the panel within a wide range by varying the angle $\alpha$ of the members 200 within a range which is efficient for good operation. In the described apparatus the thickness of the formed panel can be varied by merely changing the angle $\alpha$ of the mold members 200 and replacing the L-shaped side plates of the mold. It should be noted that when varying the angle $\alpha$ the width of the panel as illustrated by the distance $l_2$ in FIG. 12 will also change slightly. The following relationship is found between the dimensions $l_1$ and $l_2$:

$$l_1 = l_2 + \frac{I}{\sqrt{l + r^2 g \alpha}}$$

The following table gives the values, calculated by the above relationship to be taken for $l_1$ in order to obtain panels of a constant width, for example 630 mm for the various gauges:

TABLE NO. 2

| gauge of panel | $l_1$ |
|---|---|
| 30 | 749 |
| 40 | 744 |
| 50 | 738 |
| 60 | 730 |

The necessity for a slight variation of $l_1$ when the panel gauge must be changed is not detrimental to either cost or efficiency of the plant. When changes are made with respect to the desired thickness of the panel the L-shaped strips must also be changed in order to obtain the proper values for $l_1$. Alternatively, the securing means for the L-shaped strips could be suitably displaced.

The angular slant $\alpha$ of the plate elements 200 can be varied by changing the height of the support column 230 in FIG. 6. The illustrated device acts as a multiple mold both in the position of FIG. 6 and the position of FIG. 7. When the molds defined by the mold members 200 of FIG. 6 are filled with formed panels after the expansion cycle in an oven to be described in detail hereinafter, the latch 232 is opened and the individual mold members 200 are rotated clockwise either manually or by means of mechanical assemblies described hereinafter from the position shown in FIG. 6 to the position shown in FIG. 7. The individual mold members 200 are rotated individually which will allow the operator to remove the formed panels and put a fresh extruded pre-expanded panel into the mold. Two rigid iron frames 234 and 236 shown in FIG. 6 provide a suitable support for resisting the pressure generated by the expansion of the panels within the individual mold. The individual mold plate 200 is so designed that air may freely circulate in the gap between the two aluminium sheets 206 of each mold member.

Figure 11:
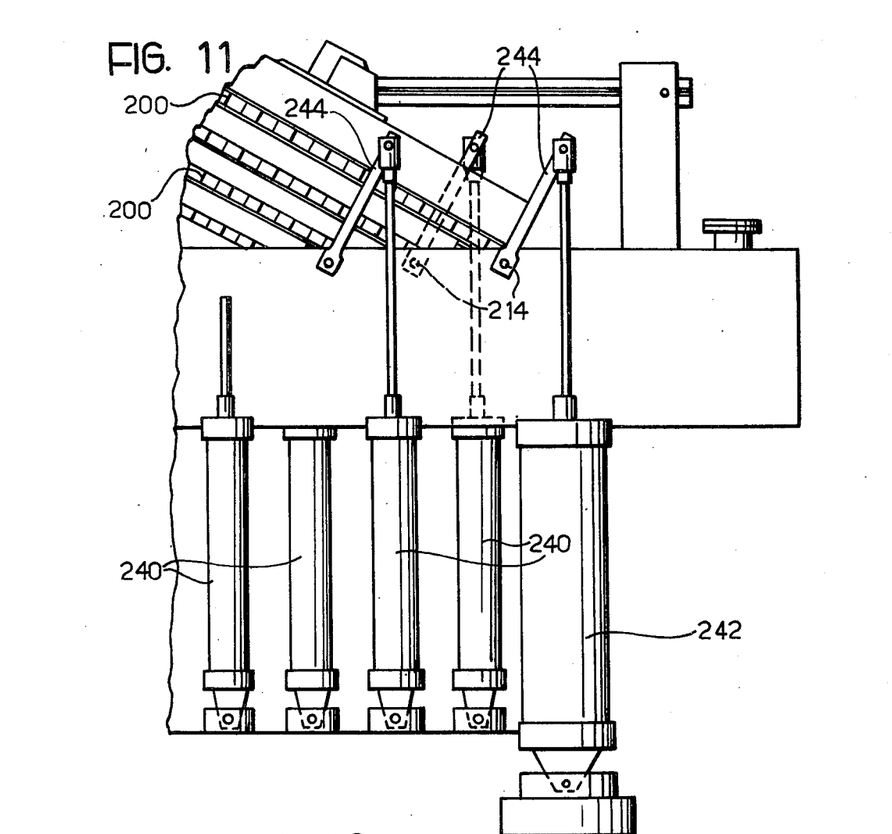
FIG. 11 is a side elevation view of a mechanical assembly for pivoting the individual plate elements shown in FIGS. 6 and 7.

In the embodiment of FIG. 11 mechanical means have been provided for rotating the individual mold members 200 about their pivots 214. A plurality of pneumatic or hydraulic cylinders 240 and 242 are connected to levers 244 which in turn are connected to the pivots 214 for rotating the panels upon energization of the cylinders.

Figure 12:
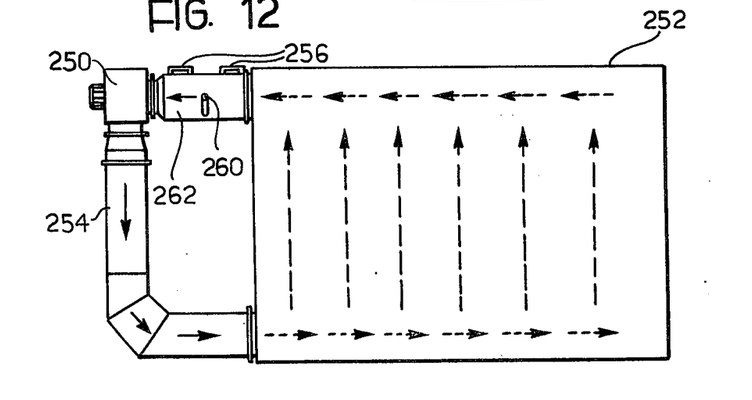
FIG. 12 is a plan view of an oven for containing the apparatus shown in FIG. 6.
Figure 13:
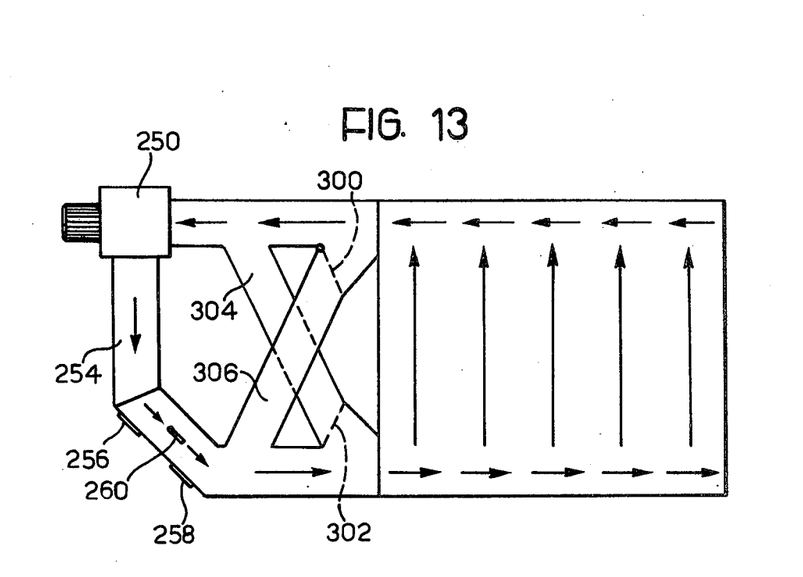
FIGS. 13, 14 show a variation of the oven of FIG. 12.
Figure 14:
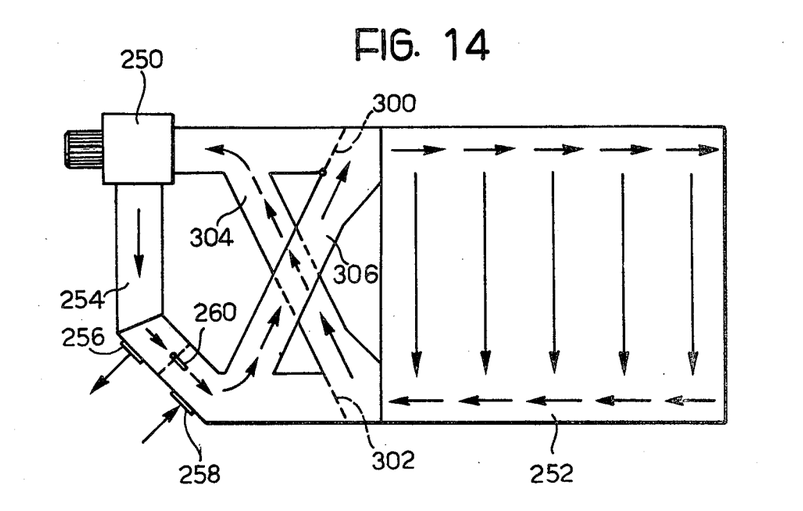

The schematic plan view of the oven in which the mold assemblies are located is shown in FIG. 12. The blower 215 is provided for circulating the air through the oven 252 in the direction of the arrows. The air is heated by passing over heating elements located in the passage member 254 which also include means for adjusting during the cycle the temperature of the air according to the working time in the temperature in the mold plate. A pair of ventilation doors 256 and 258 are provided which may be manually or automatically opened and closed. A throttle gate (not shown) which is controlled by the projection 260 is located within the chamber 262 to open or close the passage for the air through said chamber. When a mold assembly such as that shown in FIG. 10 is located within the oven the external dimensions of the mold assembly are substantially equal to the internal dimensions of the oven so as to force most of the air through the passages between the plate 206 of the individual mold members 200. Therefore the plates of the mold members are quickly heated to the desired temperature and the heat is transmitted from the plates to the panels by both connection and radiation. Complete expansion is achieved in a period of time from 12 to 25 minutes. It has been found that in order to obtain a more uniform and more rapid expansion it is useful to change the direction of the air flow periodically, for instance every 30–60 seconds. This can be made by the oven shown in FIGS. 13, 14 which is provided with auxiliary conduits 304, 306 and gates 300, 302. The gates 300, 302 are displaced periodically between the positions shown in FIGS. 300, 302 to cause the air flow to be inverted. When the throttle gate in the chamber 262 is closed, doors 256 and 258 are opened and the heaters in the section 254 are switched off so that cold air coming from the outside is then circulated through the molds in order to cool the molds and the formed panels within the molds in a matter of minutes.

With the illustrated device the working cycle is as follows:

1. Removal of formed panels and laying of unformed panels into the mold. During this operation the unit changes for example from the configuration shown in FIG. 6 to the configuration shown in FIG. 7.

2. The entire mold assembly is introduced into the oven where expansion and formation of the panels is achieved by the passage of heated air through the mold members. The formed panels are subsequently cooled by the passage of unheated air.

3. The mold assembly which may be equipped with wheels mounted on rails may then be removed from the oven for the removal of the formed panels and insertion of fresh pre-expanded panels. In this process the mold plates will move from the position shown in FIG. 7 to the position shown in FIG. 6.

By the use of several complete mold assemblies and ovens the operator can continuously remove formed panels and insert unformed panels into the molds. In this way the required labour for production of a finished panel will only involve the time taken to rotate an individual mold member, and remove a formed panel and lay an unformed panel into the mold, in spite of the fact that the expansion cycle is relatively long and the average and final expansion temperature measured in the panel are relatively low (for example the average temperature is 87 degrees C and the final temperature is 95 degrees C). Therefore in a plant having a plurality of units of the type described above is possible to obtain expansion of the panels in a relatively low temperature in order to provide panels having a very high modulus of elasticity in compression.

The pre-expanded panels suitable for use with the means and processes covered by the present invention are generally expanded polystyrene panels produced by extrusion and the simultaneous injection of a propellent agent. The extruded panels do not need to comply with strict rules as to regular shape and dimensions since this will be achieved during an expansion. By the means and processes of the present invention it will also be possible to use pre-expanded panels of a certain gauge sliced from thicker panels.

When an gaseous fluid is used as the heat convection means it is possible to successfully form a single panel from two or more panels the total gauge of which will be equal to the desired gauge. In this case the plurality of panels are piled in a single mold and provide a single formed panel since their surfaces will be fully welded together during expansion.

It was found that the pre-expanded panels are suitable for the process according to the present invention if the extruder is fitted with proper means for the uniform cooling of the expandable plastic material to the required temperature before it exits from the extrusion die. As a matter of fact it was found that low density and very stiff panels in accordance with the present invention cannot be obtained when the temperature of the expandable mass before exit from the die is higher than a predetermined value which is primarily depended on the quality and quantity of the propellent agent and the molecular weight of the polystyrene resin used. It was also found that both stiffness and dimensional stability of a panel formed by the air of the present invention increase to a perceptible degree if the pre-expanded panel has been given a certain conditioning immediately after extrusion. It was also found that the longer the conditioning time the lower will be the minimum density obtained for a certain type of pre-expanded panel. This also holds true in the case of equal conditioning time periods having a higher conditioning temperature.

Table No. 3 shows the results of forming tests connected with the apparatus covered by the present invention on a number of pre-expanded panels of the same type. The thickness and the density of formed panels as well as the conditioning time and temperature of unformed panels will vary and proper measures and remarks were noted. The data in Table No. 3 shows that the longer the conditioning time and in the case of equal time, the higher the conditioning temperature, the modulus of elasticity in compression and the dimensional stability of the formed panel tend to increase up to a limit shown by the table. It is also evident that very low density (for example 18–20 Kg/c.m.), especially if accompanied by good compressive strength and dimensional stability, can be obtained only in that case where the unformed panels were properly conditioned during a time depending upon the conditioning temperature.

TABLE NO. 3

| TEST NUMBER | CONDITIONING TIME | CONDITIONING TEMPERATURE | LOWEST DENSITY OBTAINABLE WITH PANEL AND MOULD USED | FINAL DENSITY OBTAINED (WATER=I) | MODULUS OF ELASTICITY IN COMPRESSION OF FORMED PANEL++ | RATE OF SHRINKAGE IN FORMED PANEL IN TRANSVERSE DIRECTION TO EXTRUSION REMARKED 12 h. AFTER FORMING | RATE OF SHRINKAGE REMARKED 3 DAYS AFTER FORMING | REMARKS 3 DAYS AFTER FORMING |
|---|---|---|---|---|---|---|---|---|
| 1 | 24 hours | 20° C. | 0.028 | 0.028 | 48 Kg/sq.cm. | 4% | 2% | Panel slightly deformed |
| 2 | 24 hours | 20° C. | 0.024 | 0.024 | 40 Kg/sq.cm. | 6% | 3% | Panel deformed |
| 3 | 24 hours | 20° C. | 0.020 | >0.020 | — | — | — | — |
| 4 | 4 days | 20° C. | 0.020 | 0.020 | 32 Kg/sq.cm. | 12% | 7% | Panel deformed |
| 5 | 30 hours | 65° C. | 0.028 | 0.028 | 58 Kg/sq.cm. | 1% | 0% | Panel regular |
| 6 | 30 hours | 65° C. | 0.024 | 0.024 | 48 Kg/sq.cm. | 3% | 1.5% | Panel slightly deformed |
| 7 | 30 hours | 65° C. | 0.020 | >0.020 | — | — | — | — |
| 8 | 60 hours | 65° C. | 0.024 | 0.024 | 68 Kg/sq.cm. | 1% | 0% | Panel regular |

TABLE NO. 3-continued

| TEST NUMBER | CONDITIONING TIME | CONDITIONING TEMPERATURE | LOWEST DENSITY OBTAINABLE WITH PANEL AND MOULD USED | FINAL DENSITY OBTAINED (WATER=I) | MODULUS OF ELASTICITY IN COMPRESSION OF FORMED PANEL++ | RATE OF SHRINKAGE IN FORMED PANEL IN TRANSVERSE DIRECTION TO EXTRUSION REMARKED 12 h. AFTER FORMING | RATE OF SHRINKAGE REMARKED 3 DAYS AFTER FORMING | REMARKS 3 DAYS AFTER FORMING |
|---|---|---|---|---|---|---|---|---|
| 9 | 60 hours | 65° C. | 0.020 | 0.020 | 56 Kg/sq.cm. | 2% | 1% | Panel almost regular |
| 10 | 120 hours | 65° C. | 0.024 | 0.024 | 80 Kg/sq.cm. | 0.5% | 0% | Panel regular |
| 11 | 120 hours | 65° C. | 0.020 | 0.020 | 80 Kg/sq.cm. | 1% | 0% | Panel regular |
| 12 | 120 hours | 65° C. | 0.018 | 0.018 | 76 Kg/sq.cm. | 1.5% | 0.5% | Panel almost regular |
| 13 | 180 hours | 65° C. | 0.020 | 0.020 | 92 Kg/sq.cm. | 0.5% | 0% | Panel regular |
| 14 | 15 days | 20° C. | 0.028 | 0.028 | 76 Kg/sq.cm. | 1% | 0% | Panel regular |
| 15 | 15 days | 20° C. | 0.024 | 0.024 | 60 Kg/sq.cm. | 2% | 1% | Panel almost regular |
| 16 | 15 days | 20° C. | 0.020 | 0.020 | 48 Kg/sq.cm. | 3% | 1.5% | Panel slightly deformed |
| 17 | 30 days | 20° C. | 0.024 | 0.024 | 84 Kg/sq.cm. | 1% | 0% | Panel regular |
| 18 | 30 days | 20° C. | 0.020 | 0.020 | 80 Kg/sq.cm. | 1.5% | 0% | Panel regular |
| 19 | 45 days | 20° C. | 0.020 | 0.020 | 84 Kg/sq.cm. | 1% | 0% | Panel regular |

++(according to ASTM 1621-73)

The pre-expanded panels used for the test under Table 3 were prepared using high molecular weight, heat resistant polystyrene resin of the "TAL" type produced by Montedison. It was found that when using a polystyrene resin having a lower molecular weight and a lower heat resistance the results became worse. Table No. 3 gives evidence that stiffness and dimensional stability are closely connected and that high values of modulus of elasticity in compression correspond to satisfactory dimensional stability or a low values correspond to shrinking and deformation in the finished panel. When cooling after expansion and forming, the pressure in the cells of the panels tends to descrease and to become lower than atmospheric pressure. Therefore shrinking and deformation takes place in the formed panel when the cellular structure is squeezed due to a pressure difference which is established between the external atmosphere and the gaseous mass contained in the individual cells.

EXAMPLES

Pre-expanded panels 1240 mm long, 590 mm wide, 25 to 60 mm thick are obtained using the Twin-Screw RC. 41/E built by LMP under Colombo's patents. The extruder is fitted with an extrusion die suitable for production of panels 590–600 mm wide, and of all required means, such as expanding plates with adjustable gap, roller haul-offs for hauling and cooling, side cutters for establishing sharp corners, cutting devices etc., for production of panels of said size. The extruder is fed with a mixture having the following composition, at a rate of 200 Kg. per hour:

| Material | Parts (based on weight) |
|---|---|
| TAL polystyrene resin (by Montedison) | 100 |
| Citric Acid | 0.12 |

-continued

| Material | Parts (based on weight) |
|---|---|
| Sodium Bicarbonate | 0.220 |
| Talc | 0.300 |
| Penthabromochlorocyclohexane | 2 |

As a propellent agent, a mixture of 20 parts by weight of Freon II and 80 parts of Freon 12 is injected into the extruder at a rate of 28–32 Kg. per hour; therefore the propellent agent forms approx. 12.2 to 13.7 percent by weight of the expandable mass being formed into the barrel of the extruder. The screw speed is approx. 20 rev. per minute; the temperature of the barrel ranges from 220° C. (top and center) to 100° C. (end). The expandable mass enters the cooling device included in the plant at a temperature of 148° C. and flows into the extrusion die after its cooling at a temperature of 135° C. At the exit from the die the material is given a controlled expansion; between two TEFLON (polytetrafluroethelene) coated plates and the panel thus obtained is subsequently gauged and cooled by a set of roller haul-offs. The density of pre-expanded panels thus obtained is 37 to 39 Kg/c.m..

EXAMPLE NO. 1

A pre-expanded panel 1,240 mm long, 590 mm wide, 24 mm thick obtained according to the above process, having a density of 38 Kg/c.m. and conditioned over one month at room temperature is formed using the unit illustrated in FIG. 1 and 2 properly adjusted. The temperature of the heating liquid (a saturated solution of Sodium Chloride in water) circulating through the unit at a flow of about 200 liters per minute is 107° C. The forming time of the panel is 4'10"; the total time taken by the cycle is approx. 5'.

The dimensions of the formed panel are 1250×600×45 mm and do not vary when aging; the density is 20 Kg/c.m.; the modulus of elasticity in compression, according to ASTM DI621-73 is 88 Kg/sq. cm..

Separately a piece cut from a panel of the same type as above and conditioned too for one month time at room temperature, is immersed for 2'50" in a saturated solution of Sodium Chloride 107° C. After the ensuing free expansion to all directions, the density becomes approx. 20 Kg/c.m.; the modulus of elasticity in compression results to be 35 Kg/sq. cm.. Shrinking is shown in the expanded mass just 15' after expansion.

EXAMPLE NO. 2

The experiment of example No. 1 is repeated with a temperature of circulating liquid (aqueous solution of Calcium Chloride in suitable concentration) thermally regulated at 125° C.; the forming time of panel is about 2'45"; the total time taken by the cycle is approx. 3'35"; the density of the formed panel is 20 Kg/c.m.; the modulus of elasticity in compression is 48 Kg/sq.cm..

When increasing the temperature of the heating liquid the expansion time will shorten in respect to example No. 1 but the modulus of elasticity of the formed panel will decrease a good while.

EXAMPLE NO. 3

The experiment of Example No. 1 is repeated but the unit is adjusted for a thickness of 50 mm of the formed panel.

The forming time of the panel becomes 5'; the total time taken by the cycle 6'. The final density of the panel is found to be 18 Kg/c.m..

EXAMPLE NO. 4

Twenty panels 1270 mm long, 600 mm wide, 25 mm thick, having a density of 39 Kg/c.m. obtained according to the above process and conditioned over one month at room temperature are formed using the unit illustrated in FIG. 8 after adjusting it for a final thickness of panel of 45 mm. By means of the oven schematically shown in FIG. 16 hot air is circulated in the gaps of the multiple mold during a time of 16'. During this period of time the temperature of circulating air, of mold plates and of the inside of the panel vary as a function of time according to the following table:

TABLE NO. 4

| Time | Temperature of Circulating Air | Temperature of Plates | Temperature Measured Into The Panel |
|---|---|---|---|
| 0' | 19° | 19° | 19° |
| 2' | 100° | 56° | 40° |
| 4' | 120° | 82° | 55° |
| 6' | 135° | 100° | 66° |
| 8' | 125° | 110° | 75° |
| 10' | 110° | 110° | 82° |
| 12' | 110° | 110° | 93° |
| 16' | 110° | 110° | 97° |

TABLE NO. 4

The heating cycle is followed by a cooling cycle, conducted in the illustrated manner, lasting about 3'. The density of the formed panels, which are 1280 mm long, 630 mm wide, 45 mm thick, is found to be 20.4 Kg/c.m.. The modulus of elasticity in compression, according to ASTM DI621-73, is found to be 112 Kg/sq.cm.. The compression strength at 10 percent deflection according to ASTM DI621-73 is 2.3 Kg/sq. cm.

Factor $p$ of thermal conductivity is 0.025 Koal/sq. m./hour/°C/m.. The modulus of elasticity in compression for panels of even density obtained by steam moulding of pre-expanded beads is generally 18-22 Kg/sq.cm.. Panels directly extruded which are marketed have a compression strength comparable to that of panels obtained as per this Example No. 4 if their density is now lower than 33-34 Kg/c.m..

EXAMPLE NO. 5

The experiment of Example No. 4 is repeated starting with the plates at a temperature of 70°-80° C. (that is the temperature at the end of the antecedent cooling cycle). The duration of the heating cycle necessary for forming of the panels is reduced from 16 minutes to 12 minutes.

EXAMPLE NO. 6

The experiment of Example No. 4 is repeated after adjusting the multiple mold for a thickness of 40 mm for the formed panel and an heating cycle a bit shorter. The density of formed panels is found to be 23 Kg/c.m., while the modulus of elasticity in compression is 116 Kg/sq.cm. and the compression strength at 10 percent deflection is 2.5 Kg/sq.cm.

EXAMPLE NO. 7

The experiment of Example No. 4 is repeated but the length and width of the pre-expanded panels are brought to resp. 1260 mm (from 1270) and 570 (from 600 mm). The final density is found to be 19 Kg/c.m.; the modulus of elasticity in compression 108 Kg./sq.cm; the compression strength at 10 percent deflection 1.9 Kg/sq.c.m..

EXAMPLE NO. 8

Twenty pre-expanded panels 1216 mm long, 698 mm wide, 17 mm thick cut from extruded panels 0.037 density 51 mm thick, conditioned for one month time at room temperature are formed as for Example No. 4 but after adjusting the unit for a final thickness of formed panel of 30 mm.

The density of formed panels is found to be 19 Kg/c.m.; the modulus of elasticity in compression, according to ASTM DI621-73, is 128 Kg/sq.cm..

EXAMPLE NO. 9

The experiments of Examples 4-8 inclusive are repeated with pre-expanded panels extruded by using only Freon 12 instead of a mixture of 20 parts by weight of Freon 11 and 80 parts of Freon 12 and conditioned over one month at room temperature.

The results continue to be substantially the same of the foregoing Examples, if the circulating air and the plates of the molds are regulated at a temperature higher than about 8°-10° C.

We claim:

1. A process for obtaining an expanded polystyrene panel comprising aging pre-expanded extruded panels of polystyrene at approximately room temperature for approximately a month, placing each of said pre-expanded aged panels into a mold box having a length and width slightly larger than the length and width of each panel and a depth approximately 1.6 to 2 times the thickness of each panel, heating each panel in said mold box by circulating a heated fluid in adjacency to said panel, thereby further expanding said panel into full engagement with said mold box to obtain an expanded panel having a density below 25 KG/C.M. and a modulus of elasticity in compression above 60 KG/SQ C.M.

2. A process according to claim 1 further comprising increasing the compression strength of the formed panel by using expansion temperatures not greater than 97° C. and expansion cycles of at least about 16 minutes so as to obtain a panel having a value of the modulus of elasticity in compression which is almost 5.5 times the value of the density of the panel.

* * * * *